US006513502B1

(12) United States Patent
Sunwoo et al.

(10) Patent No.: US 6,513,502 B1
(45) Date of Patent: Feb. 4, 2003

(54) NEEDLE LIFT ESTIMATION SYSTEM OF COMMON-RAIL INJECTOR

(75) Inventors: Myoung-Ho Sunwoo, Seongnam (KR); Jung-Whun Kang, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/141,364

(22) Filed: May 7, 2002

(30) Foreign Application Priority Data

May 7, 2001 (KR) .................................... 2001-0024499

(51) Int. Cl.[7] ......................... F02B 49/00; G01M 15/00

(52) U.S. Cl. ..................... 123/494; 123/456; 73/119 A; 239/73

(58) Field of Search ................................ 123/494, 357, 123/500, 501, 456; 73/119 A, 49.7, 119, DIG. 3; 239/73

(56) References Cited

U.S. PATENT DOCUMENTS 3,942,366 A * 3/1976 Hofman .................... 73/119 A
4,791,809 A * 12/1988 Schmidt ................... 73/119 A
5,069,064 A * 12/1991 Wolff ........................ 73/119 A
5,282,570 A * 2/1994 Johnson et al. ............... 239/73
5,621,160 A * 4/1997 Carroll, III et al. ........ 73/119 A
5,996,557 A * 12/1999 Muraki ....................... 123/502
6,305,355 B1 * 10/2001 Hoffmann et al. .......... 123/467

* cited by examiner

*Primary Examiner*—Carl S. Miller
(74) *Attorney, Agent, or Firm*—Pennie & Edmonds LLP

(57) ABSTRACT

The present invention provides a needle lift estimation system of a common-rail injector on the basis of solenoid voltage and measured current. In addition, the present invention provides a method for estimating a needle lift that comprises: measuring a current that is supplied to a solenoid; estimating an armature lift and an armature speed on the basis of the current of the solenoid; and estimating a needle lift from a state equation having the measured solenoid current, the estimated armature lift, and the estimated armature as state variables.

5 Claims, 9 Drawing Sheets

NEEDLE LIFT ESTIMATION SYSTEM OF COMMON-RAIL INJECTOR

FIELD OF THE INVENTION

The present invention relates to a needle lift estimation system of a common-rail injector used for a high-speed direct injection system of a diesel engine, and more particularly, to a needle lift estimation system of a common-rail injector for estimating needle lift based on measured current and solenoid voltage of the common-rail injector.

BACKGROUND OF THE INVENTION

Diesel fuel injection systems typically utilize a cam-driven apparatus in order to generate injection pressure, where injection pressure increases and accordingly an amount of injected fuel also increases as the rotating speed of the cam increases. However, such a cam-driven apparatus is generally reliable only when injection pressure is somewhat low.

In addition, use of a high-speed direct injection (HSDI) engine is becoming more prevalent for passenger vehicles as well as commercial vehicles. The HSDI engine consumes less fuel and generates more power than an indirect fuel injection engine. In a common-rail injection apparatus used for such an HSDI engine, generation of injection pressure and injection of the pressurized fuel are totally separate. For separation of the two functions, a high-pressure accumulator or rail is used to maintain high fuel pressure.

In such a common-rail injection apparatus, a nozzle injector equipped with a solenoid is disposed at a position where a nozzle holder was disposed previously. High fuel pressure is generated by a radial piston pump for which rotation speed is easily controlled separately from engine revolution speed, within a predetermined range. This system provides more freedom for designing fuel injection, and accordingly the combustion mechanism, because it enables separate design and assembly of fuel pressure generating devices and fuel injection devices.

An injector used in the common-rail injection system utilizes a high-speed and high-pressure solenoid. It regulates injection timing, injection period, and injection ratio using electrical forces of the solenoid. Precise control of injection timing, injection period, and injection ratio make it possible to decrease the amount of exhaust gases output and increase engine efficiency. On the basis of precise data on needle lift, injection timing, injection period, and injection ratio can be precisely determined.

For precise estimation of the needle lift, an eddy-current-type sensor has been used. In the estimation method using the eddy-current-type sensor, displacement of a coil in the magnetic field that moves in response to the displacement of the needle is changed to a specific electrical signal, and the needle lift is estimated from the electrical signal. There are also estimation methods using an optical sensor utilizing an optical fiber, estimation methods using ultra-sonic waves, and a contacting-type estimation method. Such methods commonly estimate the needle lift using a sensor.

For engine control, various kinds of engine operating parameters are required, and correspondingly, various kinds of sensors are needed for detecting the various kinds of engine operating parameters. These sensors add to the cost of producing the engine, and in particular, the sensor for detecting the needle lift for operating the common-rail injector significantly increases manufacturing cost.

SUMMARY OF THE INVENTION

The present invention provides a needle lift estimation system for a common-rail injector and a method thereof, in which the needle lift can be estimated on the basis of the solenoid voltage and measured current without various sensors.

In a preferred embodiment of the present invention, a needle lift estimation method comprises measuring a current that is supplied to a solenoid, estimating an armature lift and an armature speed on the basis of the current supplied to the solenoid, and estimating a needle lift from a state equation including the measured solenoid current, the estimated armature lift, and the estimated armature speed as state variables.

In another preferred embodiment of the present invention, a needle lift estimation system comprises an observer that measures a solenoid current and estimates an armature lift and an armature speed, wherein the armature regulates the pressure of the pressure-control chamber. The armature moves up and down by the magnetic force of the solenoid coil, and a needle is operated in response to the movement of the armature such that the needle opens or closes an injection hole.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
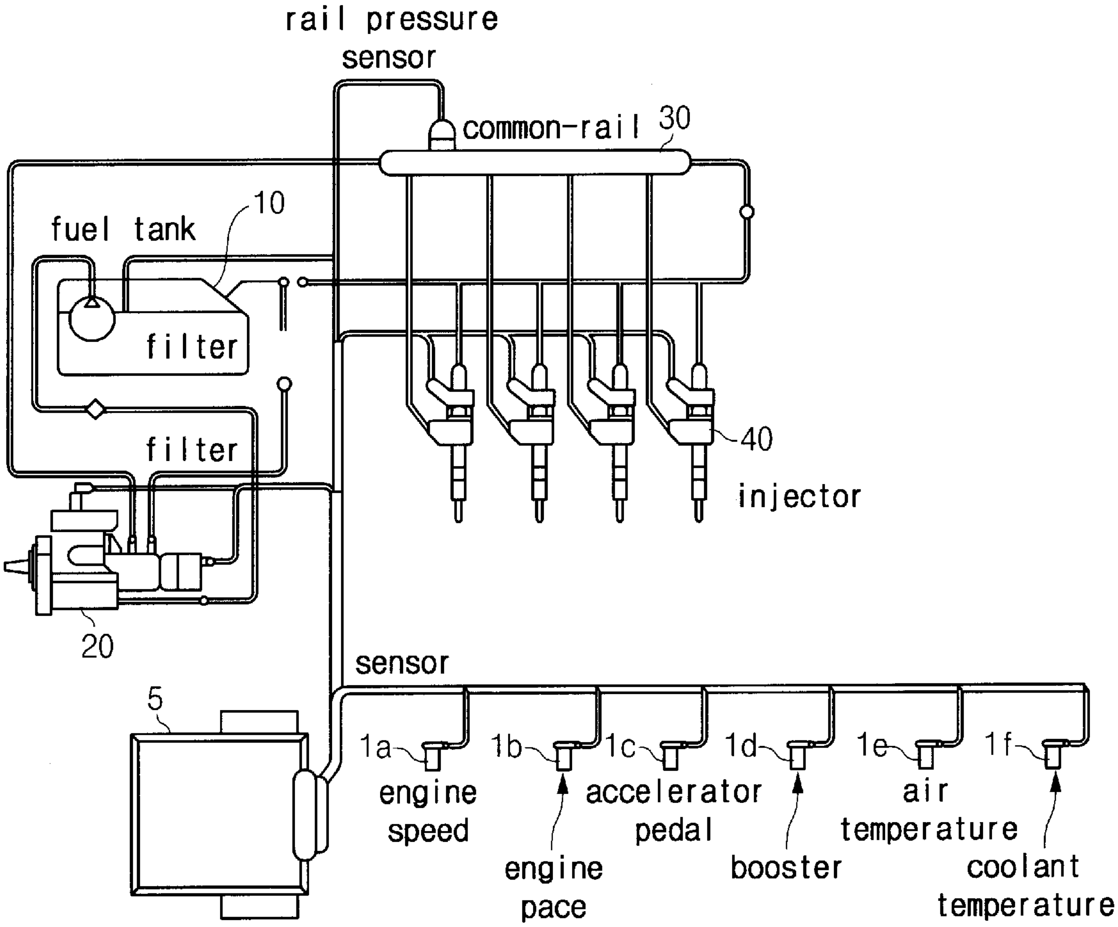
FIG. 1 is a schematic view of a high-speed direct injection diesel engine having a general common-rail injection system.

As shown in FIG. 1, a common-rail injection system comprises a plurality of injectors 40 that are electronically controlled; a pump 20 for providing highly pressurized fuel; a common-rail 30 for guiding the pressurized fuel provided from the pump 20 to the injectors 40; and an electronic control unit (ECU) 5 that receives various signals from sensors 1*a* through 1*f*, such as an engine speed sensor, an accelerator pedal sensor, an air temperature sensor, and a coolant temperature sensor, and provides a current to the injector such that an injector lift is changed.

Figure 2:
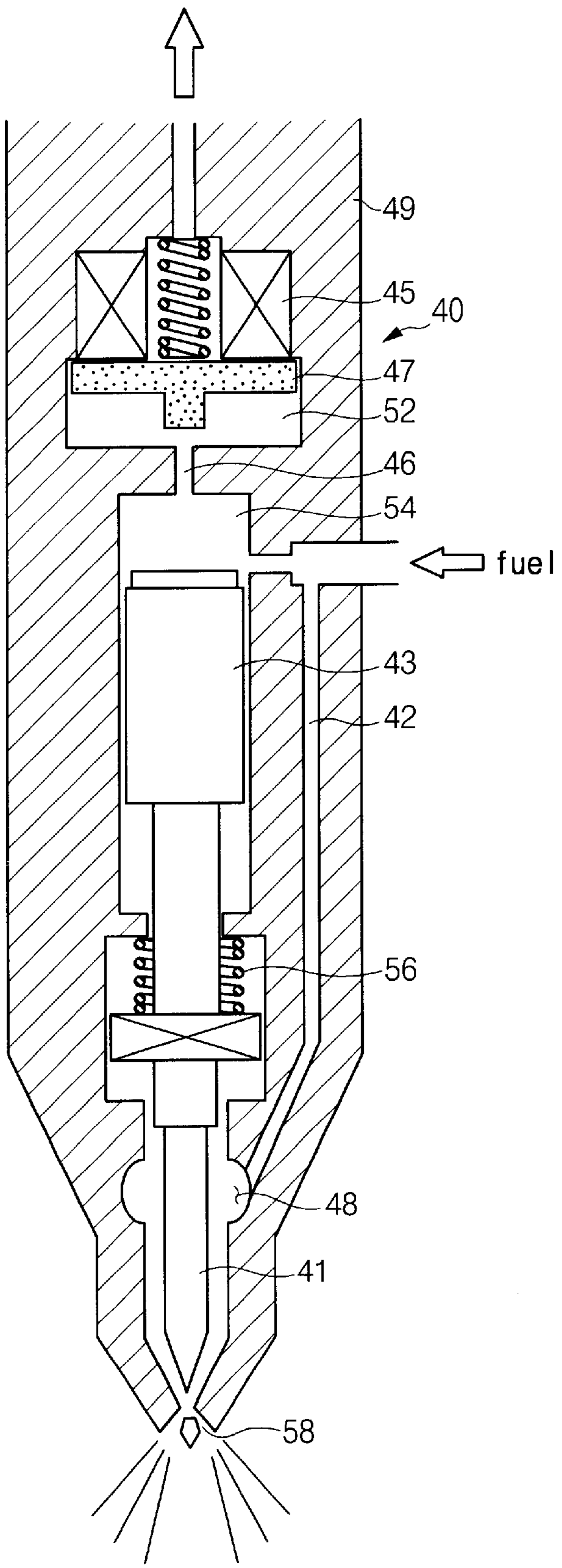
FIG. 2 is a sectional view of an injector of FIG. 1.

The injector 40, as shown in FIG. 2, comprises a body 49 provided with an injection hole 58 formed in a lower portion thereof through which the pressurized fuel is injected; a needle 41 that is disposed inside the body 49 and moves vertically such that the injection hole 58 is opened or closed; a solenoid coil 45 that is disposed inside the body 49 and above the needle 41; an armature 47 that is disposed between the solenoid coil 45 and the needle 41 and controls a pressure of injected fuel when moved by magnetic force generated in the magnetic field formed by the solenoid coil 45 to which a current is supplied from the ECU 5.

A spring 56 is disposed around the needle 41 such that the spring 56 is expanded or contracted by the vertical movement of the needle 41. An orifice 46 is formed between a control piston 43 and the armature 47, and thus the orifice 46 is opened and closed by the reciprocal movement of the armature 47. The fuel flowing into the body 49 is initially stored in a pressure-control chamber 54.

Therefore, when the armature 47 opens the orifice 46, the fuel flowing into the body 49 is discharged from the injector 40 through the orifice 46. On the other hand, if the armature 47 closes the orifice 46, the fuel flowing into the body 49 moves to the injection hole 58 through a guiding line 42. As a result, the pressure in the pressure-control chamber becomes lower so that control piston 43 moves upward. Consequently, the needle 41 opens the injection hole and fuel is injected through the injection hole 58.

A dynamic model for the above-stated common-rail injector will be explained in detail hereinafter.

In a common-rail injection system, the kinetics of a fuel injection process are very complicated. A model for the injector has been derived under the following four assumptions.

(1) Pulsatory phenomenon of the pressure of the fuel provided into the injector is neglected for the pressure of the fuel inside the common-rail is regulated through a closed-loop control by an electronic control system.

(2) Pressure in the pressure-accumulation chamber is equal to the pressure of the fuel provided into the injector.

(3) Return pressure is equal to atmospheric pressure.

(4) Fuel inside the control chamber is compressible.

A dynamic model of the injector is modeled as a single input-output system having a solenoid coil voltage V as an input and a solenoid driving current i as an output, and is then expressed in a nonlinear first-order differential Equation 1 having seven state variables.

$$x=[i x_a \dot{x}_a P_a P_c x_P \dot{x}_P] \qquad \text{Equation 1}$$

where i is the solenoid current, $x_a$ is the armature lift, $P_a$ is the pressure in the armature chamber, $P_c$ is the pressure of the pressure-control chamber, $x_p$ is the needle lift, and .(dot) means to differentiate with respect to time.

The voltage V of the solenoid coil can be calculated from a function of the coil driving current i and the armature lift $x_a$ by Kirchhoff's voltage law, as shown in Equation 2.

$$\frac{di}{dt} = \frac{V - iR - E(i, x_a)\frac{dx_a}{dt}}{L(i, x_a)} \qquad \text{Equation 2}$$

where V is the voltage of the solenoid coil, $x_a$ is the armature lift, E is the back electromotive force (back e.m.f), L is the inductance of the solenoid coil, and R is the resistance of the solenoid coil.

A magnetic force of the solenoid coil 45, a resilient force of the spring 56, and the pressure caused by the difference in the fuel pressure mainly act on the armature 47. A dominant equation of the armature lift can be represented as the following Equation 3.

$$m_a \ddot{x}_a = A_a \Delta P_i + F_{mag} - m_a g \cos\theta - F_{sa0} - F_{sa} \qquad \text{Equation 3}$$

where $A_a$ is the area of the armature, $\Delta P_i$ is the difference between the armature chamber pressure and the atmospheric pressure, $F_{mag}$ is the magnetic force of the solenoid, $F_{sa0}$ is the initial spring force, $F_{sa}$ is the spring force according to the armature lift, $m_a$ is the mass of the armature, g is the acceleration of gravity, $x_a$ is the armature lift, and θ is a mounting angle of the injector. The magnetic force of the solenoid can be obtained from the following Equation 4.

$$F_{mag} = \frac{\partial \lambda(i, x_a)}{\partial x_a} \cdot i = E(i, x_a) \cdot i \qquad \text{Equation 4}$$

Figure 3:
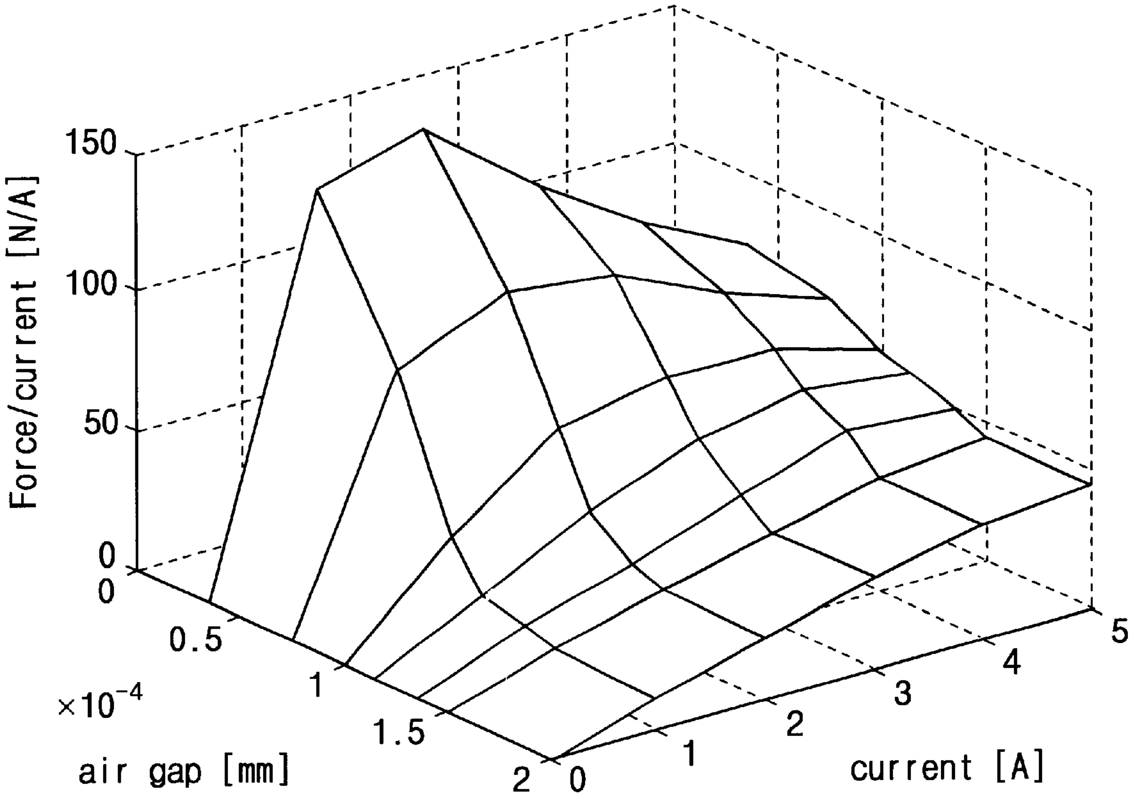
FIG. 3 illustrates the magnetic force of a solenoid according to armature lift and driving current of the injector of FIG. 2.

In the above Equation 4, $E(i,x_a)$ can be obtained from $F_{mag}/i$. Using a solenoid testing apparatus, a test for the magnetic force of the solenoid with reference to the driving current and the armature lift is performed under a constant current level. Results of the test for the magnetic force of the solenoid are shown in FIG. 3.

Figure 4:
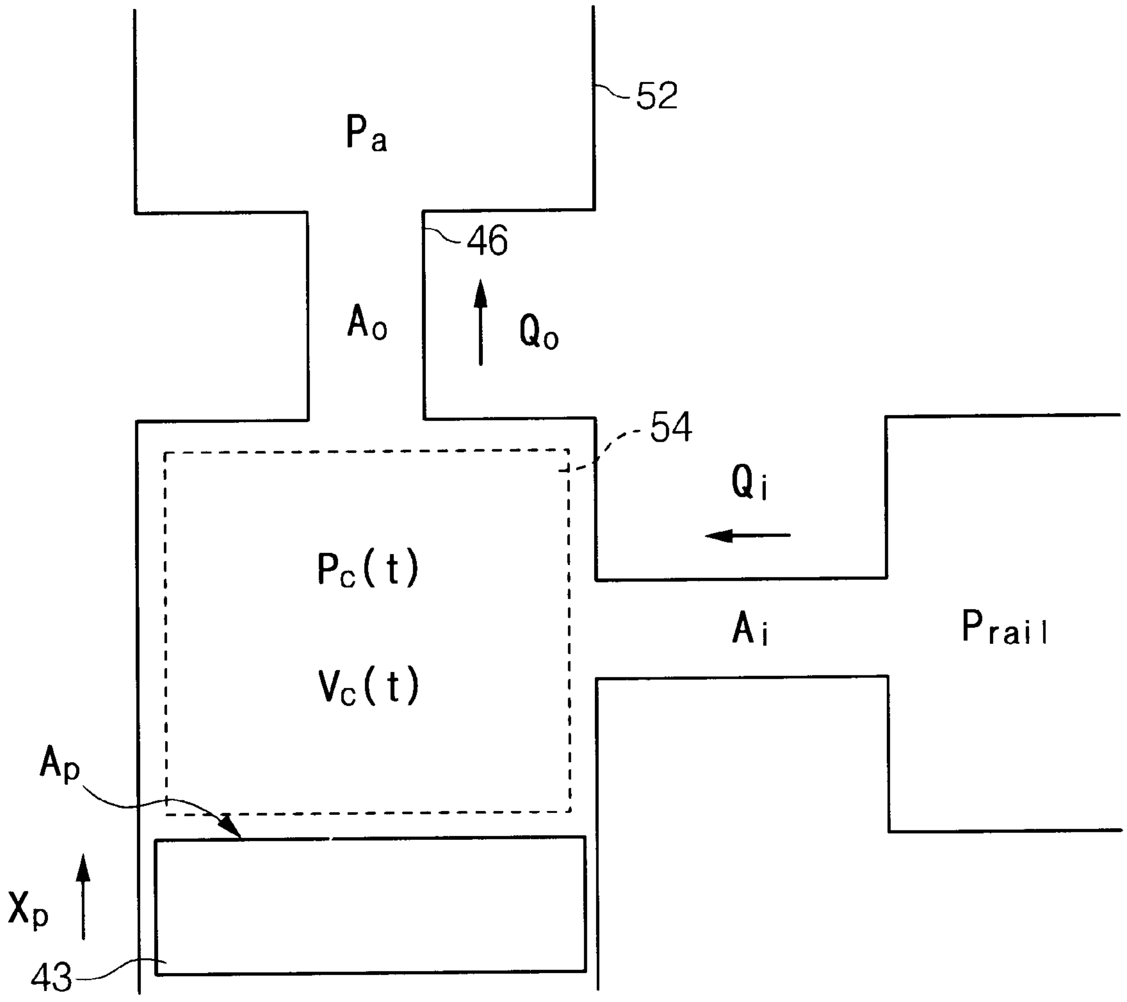
FIG. 4 is a schematic of a pressure-control chamber of the injector of FIG. 3.

As illustrated by FIG. 4, a differential equation (Equation 5) for the pressure in the pressure-control chamber 54 inside the injector body 49 can be obtained by applying a continuation equation to the simplified model of the pressure-control chamber 54.

$$\dot{P}_c = \frac{\beta_f}{V_c}\left(Q_i - Q_o - \dot{V}_c\right) = \frac{\beta_f}{V_{c0} - A_p x_p}(Q_i - Q_o + A_p \dot{x}_p) \qquad \text{Equation 5}$$

where $V_{c0}-A_p x_p$ is equal to $V_c(t)$, $V_{co}$ is the initial volume of the pressure-control chamber, $A_p$ is the area of the control piston, $x_p$ is the lift of the control piston (that is, the control piston in conduction with the needle valve), the volumenometry modulus of elasticity $\beta_f$ is $$12000\left(1 + 0.6\frac{P_c}{600}\right),$$

the quantity $Q_i$ of flow entering into the pressure-control chamber is $$Q_i = C_{di} A_i \sqrt{\frac{2}{\rho} \Delta P_i} = C_{di} A_i \sqrt{\frac{2}{\rho} |P_{rail} - P_c|},$$

and the quantity $Q_o$ of flow exiting from the pressure-control chamber is $$Q_o = C_{do} A_o \sqrt{\frac{2}{\rho} \Delta P_o} = C_{do} A_o \sqrt{\frac{2}{\rho} |P_c - P_a|}.$$

Here, $C_{di}$ and $C_{do}$ are coefficients of a quantity of flow in the entrance and the exit of the orifice respectively, $A_i$ and $A_o$ are sectional areas of the entrance and the exit of the orifice, $P_{rail}$ is the pressure of the common-rail, $P_a$ is the pressure of the armature chamber, $P_c$ is the pressure of the pressure control chamber, and ρ is a density of the fuel.

Fuel that passes through the orifice 46 returns to a fuel tank 10 (FIG. 1), and the pressure in the armature chamber 52 receiving the armature 47 is maintained at a certain level by the fuel flowing from the pressure control chamber 54. If a needle lift estimator 100 is designed under the assumption that this pressure is equal to atmospheric pressure, the correlation between the armature lift and the pressure of the pressure-control chamber is neglected so that it is impossible to estimate the needle lift from the armature lift. Therefore, if the pressure of the armature chamber 52 is considered in the injector drive model just like the pressure of the pressure control chamber 54, Equation 6 is obtained.

$$\dot{P}_a = \frac{\beta_{fa}}{V_a}(Q_{ia} - Q_{oa} + \dot{V}_a) = \frac{\beta_{fa}}{V_{a0} + A_a x_a}(Q_{ia} - Q_{oa} - A_a \dot{x}_a) \quad \text{Equation 6}$$

where $\beta_{fa}$ is equal to $12000(1+0.6*P_a/600)$, the volume of the armature chamber $V_a(t)$ is equal to $V_{a0}+A_aX_a$, the quantity $Q_{ia}$ of flow entering into the armature chamber is $$C_{do}A_o\sqrt{\frac{2}{\rho}\Delta P_i} = C_{do}A_o\sqrt{\frac{2}{\rho}|P_c - P_a|},$$

and the quantity $Q_{oa}$ of flow exiting from the armature chamber is $$C_{do}A_{oa}\sqrt{\frac{2}{\rho}\Delta P_o} = C_{do}A_{oa}\sqrt{\frac{2}{\rho}|P_a - P_{return}|}.$$

Lifts of the control piston 43 and the needle 41 can be obtained from Equation 7. The control piston 43 and the needle 41 have a role in injecting fuel according to the difference between the pressures of the pressure-control chamber 54 and the pressure-accumulation chamber 48, which creates a resultant force acting against the spring 56.

$$(m_p+m_n)\ddot{x}_p = -k_p(x_{pf}-x_{p0}) - k_p x_p - A_p P_c + P_{rail}(A_n - A_s) - (m_p+m_n)g\cos\theta \quad \text{Equation 7}$$

where $(k_p(x_{pf}-x_{p0}))$ is the initial spring force, $(k_p x_p)$ is the spring force according to the needle lift, $(A_pP_c)$ is the force according to the pressure of the pressure-control chamber, $(P_{rail}(A_n-A_s))$ is the force according to the pressure of the rail, and $((m_p+m_n)g\cos\theta)$ is the force according to gravity.

Among injector models, an armature lift estimator according to an embodiment of the present invention is designed considering only three state variables, that is, armature current, armature lift, and armature speed. Using these values, the needle lift is estimated.

Figure 5:
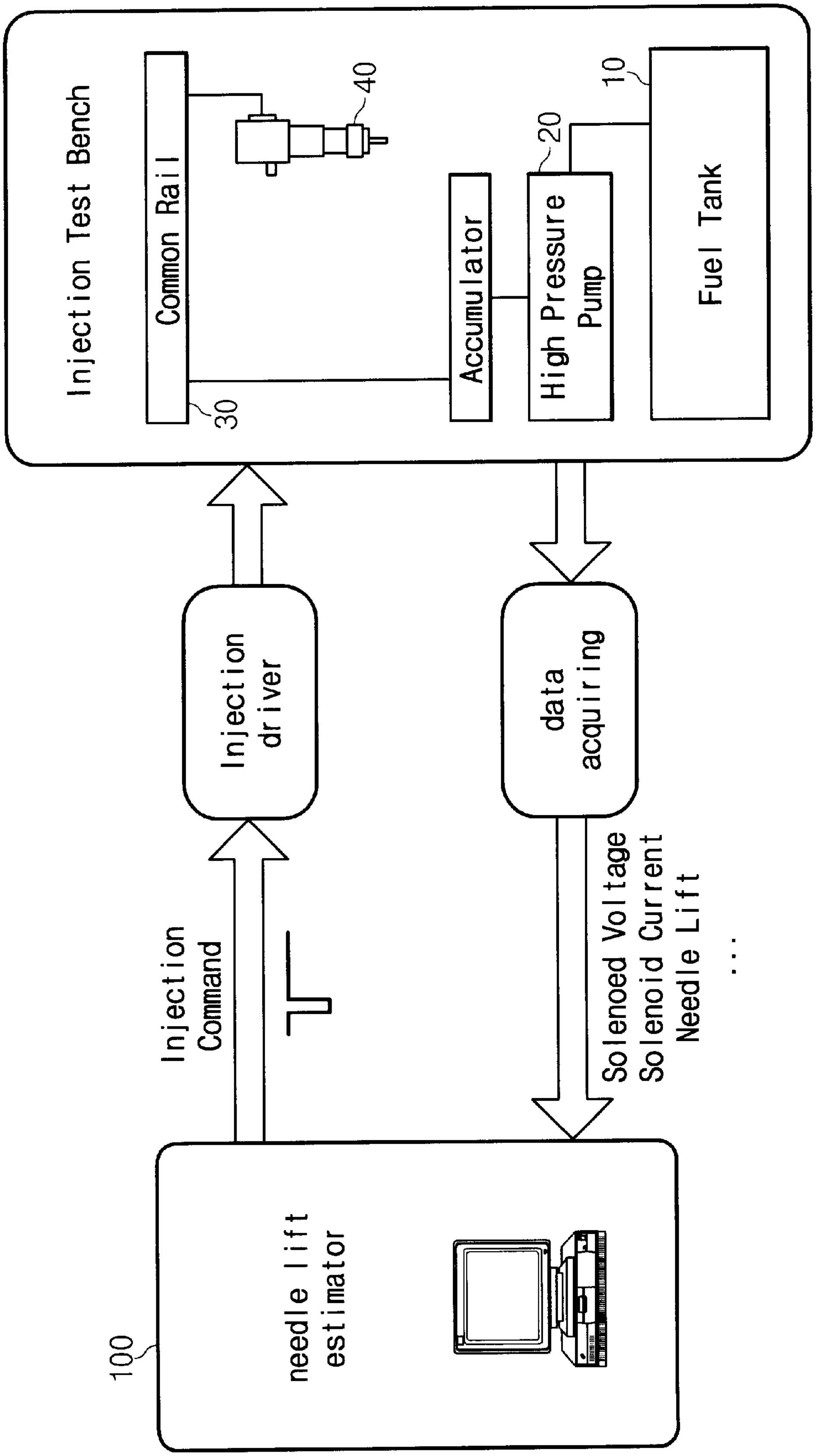
FIG. 5 is a block diagram of a needle lift estimation system according to a preferred embodiment of the present invention.

Estimator 100, as shown in FIG. 5, is one embodiment of an apparatus for estimating the state variables using the output of the control system. Preferably, in the present invention, the estimator 100 is a sliding observer that can consider modeling aberrations of a nonlinear system as shown in Equation 8.

From Equations 1 through 7, the following Equation 8 can be obtained.

$$x_1=i,\ x_2=x_a,\ x_3=\dot{x}_a,\ x_4=P_a,\ x_5=P_c,\ x_6=x_p,\ x_7=\dot{x}_p \quad \text{Equation 8}$$

where $x_1$ is the solenoid current, $x_2$ is the armature lift, $X_3$ is the armature speed, $x_4$ is the pressure in the armature chamber, $x_5$ is the pressure of the pressure-control chamber, $x_6$ is the needle lift, and $x_7$ is the needle speed.

The state variables of the injector model can be expressed in a state equation of Equation 9.

$$\dot{x} = f(x,u) \quad \text{Equation 9}$$

$$y = h(x,u)$$

$$f(x,u) = \begin{bmatrix} \dfrac{-Rx_1 - E(x_1,x_2)x_3 + u}{L(x,x)} \\ x_3 \\ \dfrac{A_o(x_5 - x_4) + E(x_1,x_2)x_1 - k_a(x_{af} - x_{a0} + x_2)}{m_a} \\ \dfrac{\beta_{fa}}{V_{a0} + A_a x_2}\left(C_{do}A_o\sqrt{\frac{2}{\rho}|x_5 - x_4|} - C_{do}A_{oa}\sqrt{\frac{2}{\rho}|x_4 - P_{return}|} - A_a x_3\right) \\ \dfrac{\beta_f}{V_{c0} - A_p x_6}\left(C_{di}A_i\sqrt{\frac{2}{\rho}|P_{rail} - x_5|} - C_{do}A_o\sqrt{\frac{2}{\rho}|x_5 - x_4|} + A_p x_7\right) \\ x_7 \\ \dfrac{-A_p x_5 + P_{rail}(A_n - A_s) - k_p(x_{pf} - x_{p0} + x_6)}{m_p + m_n} \end{bmatrix}$$

$$h(x,u) = x_1$$

where R is the resistance of the solenoid coil, E is the back force of electricity, L is the inductance of the solenoid coil, $A_o$ is the sectional area of the exit of the orifice, $k_a$ is the spring coefficient of the armature spring, $x_{af}$ is the free length of the armature spring, $x_{a0}$ is the predetermined initial length of the armature spring, $\beta_{fa}$ is the volumenometry modulus of elasticity of the fuel inside the armature chamber, $V_{a0}$ is the initial volume of the armature chamber, $A_a$ is the projection area of the armature chamber, $C_{do}$ is the coefficient of a quantity of flow in the exit of the orifice, $A_{oa}$ is the sectional area of the return line from the armature chamber to the fuel tank, $P_{return}$ is the return pressure, $\beta_f$ is the volumenometry modulus of elasticity of the fuel in the pressure control chamber, $V_{c0}$ is the initial volume of the pressure control chamber, $A_p$ is the projection area of the piston, $A_i$ is the sectional area of the entrance of the orifice, $C_{di}$ is the coefficient of quantity of flow in the entrance of the orifice, $P_{rail}$ is the pressure of the rail, $x_{pf}$ is the free length of the piston spring, $x_{p0}$ is the predetermined initial length of the piston spring, $A_n$ is the projection area of the needle, $A_s$ is the projection area of a needle valve seat, $m_p$ is a mass of the piston, and $m_n$ is the mass of the needle.

Estimator 100 includes a mathematical algorithm for estimating state variables using the output of the control system, and it is generally used for sensorless control. A large number of reaches for estimating state variables of a nonlinear system such as the injection system on the basis of the Luenberger Observer have been made, and a sliding observer is generally used for estimating state variables of a nonlinear system that can consider the modeling abbreviation.

As an armature lift observer for the injector model having state variables that can be expressed as Equation 9, a sliding observer that has a state Equation 10 is used.

$$\dot{\hat{x}}=f(\hat{x},u)+H[y-\hat{y}]+K[\mathrm{sign}(y-\hat{y})] \quad \text{Equation 10}$$

where $$H=\begin{bmatrix}h_1\\h_2\\h_3\end{bmatrix},\quad K=\begin{bmatrix}k_1\\k_2\\k_3\end{bmatrix},$$

H is a Luenberger Observer gain, and K is a sliding gain. Here, $\dot{\hat{x}}$ is an estimated value of $\dot{x}$.

The observer using Equation 10 can be realized by adding a switching term to the Luenberger Observer, and the Luenberger Observer gain H and the sliding gain K are determined.

The Luenberger Observer gain H is arbitrarily determined by the system designer, and in particular, the gain H can be determined by disposing the poles of the A-HC such that A-HC is stabilized and a desired performance can be obtained.

From Equation 10, the abbreviation dynamics can be obtained as Equation 11.

$$\dot{\tilde{x}}_1=\Delta f_1-h_1(x_1-\hat{x}_1)-k_1\mathrm{sign}(x_1-\hat{x}_1)$$

$$\dot{\tilde{x}}_2=\Delta f_2-h_2(x_1-\hat{x}_1)-k_2\mathrm{sign}(x_1-\hat{x}_1)$$

$$\dot{\tilde{x}}_3=\Delta f_3-h_3(x_1-\hat{x}_1)-k_3\mathrm{sign}(x_1-\hat{x}_1) \quad \text{Equation 11}$$

where $\dot{\tilde{x}}_i$ is equal to $\dot{x}_i-\dot{\hat{x}}_i$, $\Delta f_i$ is equal to $f_i(x,u)-f_i(\hat{x},u)$.

Equation 12 shows a sliding function s that is defined as the difference between the measured current and the estimated current, and Equation 13 shows a sliding condition regarding $\hat{x}$.

$$s=x_1-\hat{x}_1=\tilde{y}$$

$$\dot{s}=\dot{x}_1-\dot{\hat{x}}_1=\Delta f_1-h_1\tilde{y}-k_1\mathrm{sign}(\tilde{y}) \quad \text{Equation 12}$$

$$\frac{d}{dt}\left(\frac{1}{2}s^2\right)=s\dot{s}=\tilde{y}(\Delta f_1-h_1\tilde{y}-k_1\mathrm{sign}(\tilde{y}))<0 \quad \text{Equation 13}$$

The value $k_1$ for satisfying the sliding condition is set by Equation 14.

$$\frac{-Rx_1-Ex_3+u}{L}-\frac{-R\hat{x}_1-E\hat{x}_3+u}{L}=\frac{-R\tilde{x}_1-E\tilde{x}_3}{L},$$

and when sliding, s is equal to 0 so that $$\mathrm{sign}(\tilde{y})=\frac{\Delta f_1}{k_1}.$$

From Equations 11 and 14, Equation 15 is obtained.

$$\dot{\tilde{x}}_3=\Delta f_3-\frac{k_3}{k_1}\Delta f_1 \quad (a)$$

$$\dot{\tilde{x}}_3=\Delta f_3-\frac{k_3}{k_1}-R\tilde{x}_1-\frac{E\tilde{x}_3}{L} \quad (b)$$

$$\dot{\tilde{x}}_3-\frac{k_3}{k_1}\frac{E}{L}\tilde{x}_3=\Delta f_3-\frac{k_3}{k_1}\frac{R}{L}\tilde{x}_1 \quad (c) \quad \text{Equation 15}$$

The value $k_3$ is set by Equation 16 for a stabilization.

$$\lambda_{x3}=\frac{k_3}{k_1}\frac{E}{L}<0,\ k_3<0 \quad \text{Equation 16}$$

Here, $\Delta_{f3}$ is equal to $$\frac{E\tilde{x}_1-k_a\tilde{x}_2-b_a\tilde{x}_3}{m_a}.$$

Therefore, from Equation 15(b), if $x_1$ and $x_3$ are converged, $x_2$ is also converged so that k is set as 0.

The state equation of the needle lift estimator that is designed from the above results can be expressed as Equation 17. The needle lift is estimated from the current and the armature lift that are estimated from the observer using the injector model.

$$\dot{\hat{x}}_1=f_1(\hat{x},u)+h_1(x_1-\hat{x}_1)+k_1\mathrm{sign}(x_1-\hat{x}_1)$$

$$\dot{\hat{x}}_2=f_2(\hat{x},u)+h_2(x_1-\hat{x}_1)+k_2\mathrm{sign}(x_1-\hat{x}_1)$$

$$\dot{\hat{x}}_3=f_3(\hat{x},u)+h_3(x_1-\hat{x}_1)+k_3\mathrm{sign}(x_1-\hat{x}_1)$$

$$\dot{\hat{x}}_4=f_4(\hat{x},u)$$

$$\dot{\hat{x}}_5=f_5(\hat{x},u)$$

$$\dot{\hat{x}}_6=f_6(\hat{x},u) \quad \text{Equation 17}$$

$$\dot{\hat{x}}_7=f_7(\hat{x},u)$$

Experimental results of the needle lift estimator according to the present invention are shown in FIGS. 6*a* through 6*d*.

Figure 6A:
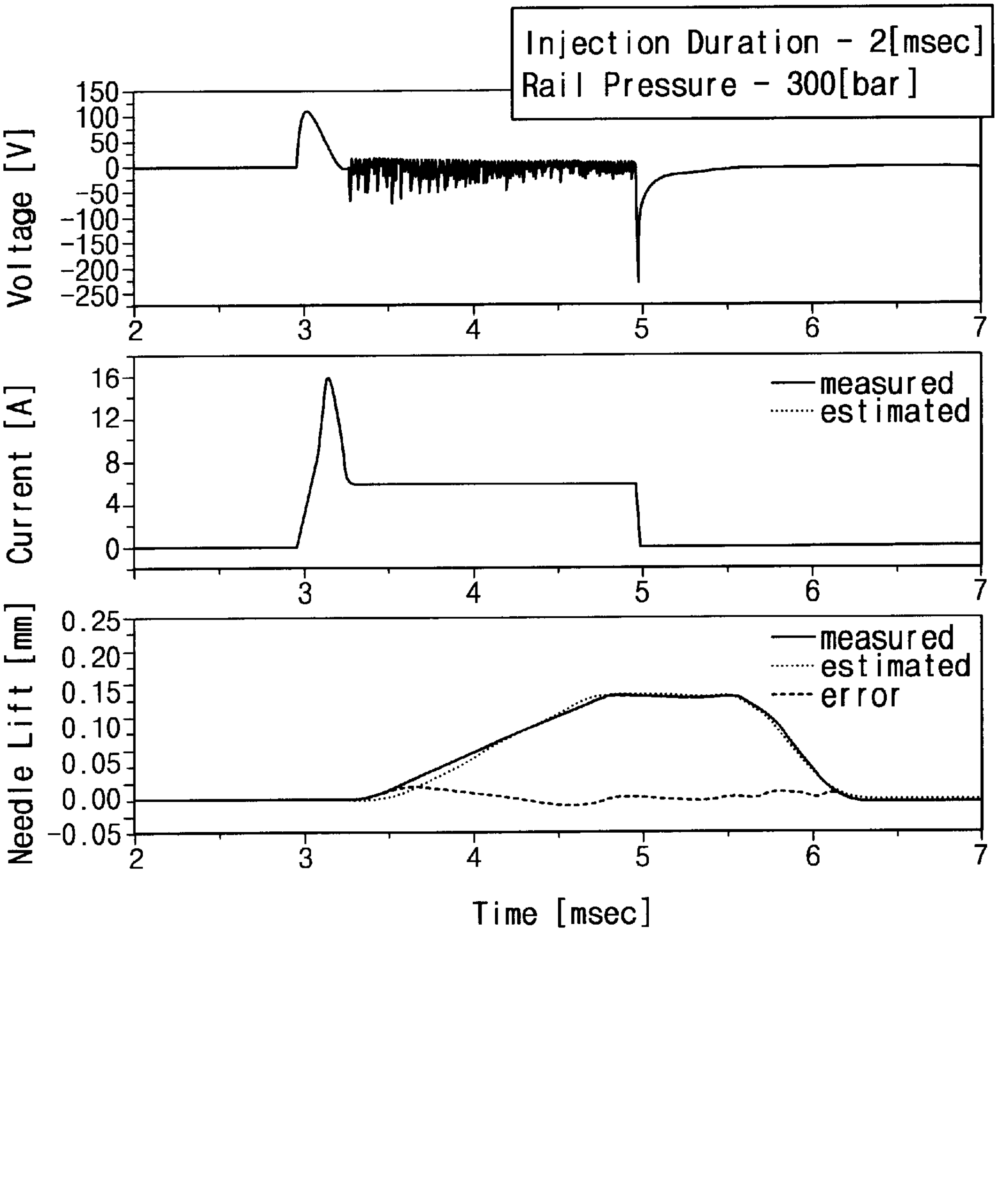
FIG. 6*a* is a graph comparing an estimated needle lift of the needle lift estimation system according to the present invention with an actually-measured needle lift when an injection duration is 2 msec and a rail pressure is 300 bar.
Figure 6B:
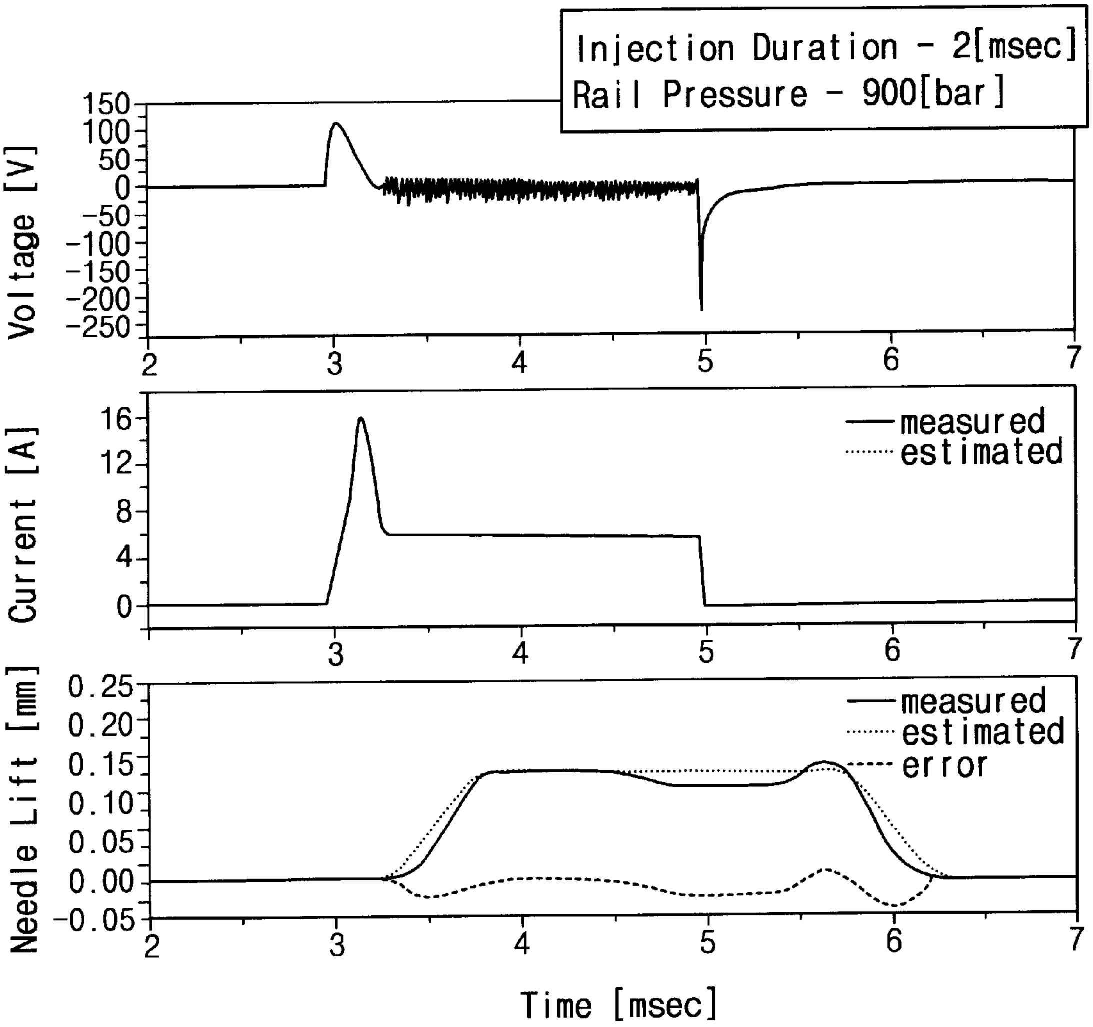
FIG. 6*b* is a graph comparing an estimated needle lift of the needle lift estimation system according to the present invention with an actually-measured needle lift when an injection duration is 2 msec and a rail pressure is 900 bar.

FIGS. 6*a* and 6*b* show results of the needle lift estimation according to a change of the rail pressure. FIG. 6*a* shows a graph comparing an estimated needle lift of the needle lift estimation system according to the present invention with an actually-measured needle lift when an injection duration is 2 msec and a rail pressure is 300 bar. FIG. 6*b* shows a graph comparing an estimated needle lift of the needle lift estimation system according to the present invention with an actually-measured needle lift when an injection duration is 2 msec and a rail pressure is 900 bar.

Figure 6C:
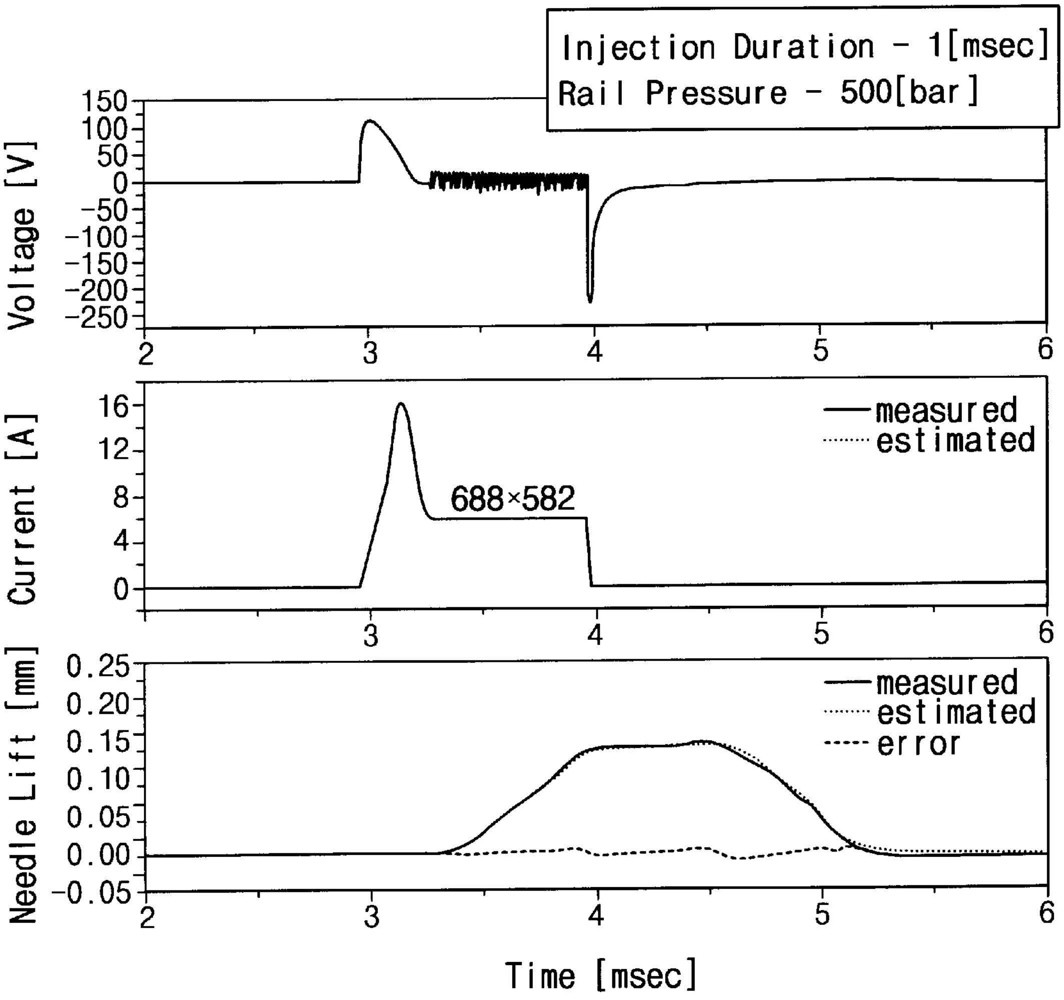
FIG. 6*c* is a graph comparing an estimated needle lift of the needle lift estimation system according to the present invention with an actually-measured needle lift when an injection duration is 1 msec and a rail pressure is 500 bar.
Figure 6D:
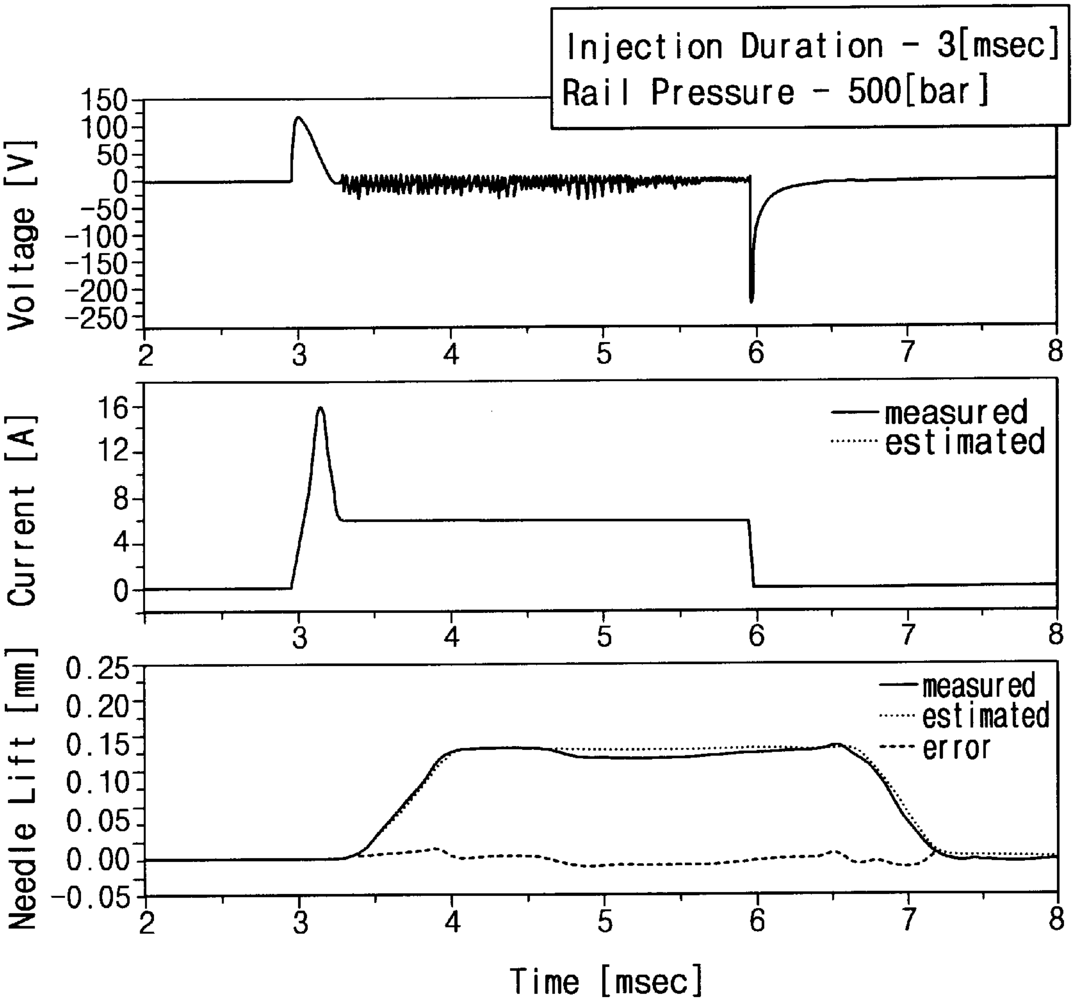
FIG. 6*d* is a graph comparing an estimated needle lift of the needle lift estimation system according to the present invention with an actually-measured needle lift when an injection duration is 3 msec and a rail pressure is 500 bar.

FIGS. 6*c* and 6*d* show results of the needle lift estimation according to the period of the operation of the injector. FIG. 6*c* shows a graph comparing an estimated needle lift of the needle lift estimation system according to the present invention with an actually-measured needle lift when an injection duration is 1 msec and a rail pressure is 500 bar. FIG. 6*d* shows a graph comparing an estimated needle lift of the needle lift estimation system according to the present invention with an actually-measured needle lift when an injection duration is 3 msec and a rail pressure is 500 bar.

In FIGS. 6*a* through 6*d*, dotted lines indicate estimated values of the needle lift estimator according to the present invention, and solid lines indicate measured values. As shown in the drawings, the estimated values and the measured values are substantially the same.

The needle lift estimator according to the present invention can therefore precisely estimate the needle lift of the common-rail injector without a lift sensor.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system for estimating a needle lift of an injection system including an armature for regulating pressure in a pressure control chamber and a needle for opening or closing a fuel injection hole, the system comprising an observer for measuring a solenoid current and estimating an armature lift and an armature speed, wherein the observer acquires the solenoid current, the armature lift, and the armature speed through the following equations:

$$\dot{\tilde{x}}_1=\Delta f_1-h_1(x_1-\hat{x}_1)-k_1\text{sign}(x_1-\hat{x}_1)$$

$$\dot{\tilde{x}}_2=\Delta f_2-h_2(x_1-\hat{x}_1)-k_2\text{sign}(x_1-\hat{x}_1)$$

$$\dot{\tilde{x}}_3=\Delta f_3-h_3(x_1-\hat{x}_1)-k_3\text{sign}(x_1-\hat{x}_1)$$

wherein $\Delta f_i$ is $f_i(x,u)-f_i(\hat{x},u)$, and wherein the needle lift is estimated through the following equations:

$$\dot{x} = f(x, u)$$

$$y = h(x, u)$$

$$f(x,u)=\begin{bmatrix} \dfrac{-Rx_1-E(x_1,x_2)x_3+u}{L(x,x)} \\ x_3 \\ \dfrac{A_o(x_5-x_4)+E(x_1,x_2)x_1-k_a(x_{af}-x_{a0}+x_2)}{m_a} \\ \dfrac{\beta_{fa}}{V_{a0}+A_a x_2}\left(C_{do}A_o\sqrt{\dfrac{2}{\rho}|x_5-x_4|}-C_{do}A_{oa}\sqrt{\dfrac{2}{\rho}|x_4-P_{return}|}-A_a x_3\right) \\ \dfrac{\beta_f}{V_{c0}-A_p x_6}\left(C_{di}A_i\sqrt{\dfrac{2}{\rho}|P_{rail}-x_5|}-C_{do}A_o\sqrt{\dfrac{2}{\rho}|x_5-x_4|}+A_p x_7\right) \\ x_7 \\ \dfrac{-A_p x_5+P_{rail}(A_n-A_s)-k_p(x_{pf}-x_{p0}+x_6)}{m_p+m_n} \end{bmatrix}$$

$$h(x, u) = x_1$$

$$\dot{\hat{x}}_1=f_1(\hat{x},u)+h_1(x_1-\hat{x}_1)+k_1\text{sign}(x_1-\hat{x}_1)$$

$$\dot{\hat{x}}_2=f_2(\hat{x},u)+h_2(x_1-\hat{x}_1)+k_2\text{sign}(x_1-\hat{x}_1)$$

$$\dot{\hat{x}}_3=f_3(\hat{x},u)+h_3(x_1-\hat{x}_1)+k_3\text{sign}(x_1-\hat{x}_1)$$

$$\dot{\hat{x}}_4=f_4(\hat{x},u)$$

$$\dot{\hat{x}}_5=f_5(\hat{x},u)$$

$$\dot{\hat{x}}_6=f_6(\hat{x},u)$$

$$\dot{\hat{x}}_7=f_7(\hat{x},u)$$

wherein $x_1$ is a solenoid current, $x_2$ is an armature lift, $x_3$ is an armature speed, $x_4$ is a pressure of the armature chamber, $x_5$ is a pressure of the pressure control chamber, $x_6$ is a needle lift, and $x_7$ is a needle speed.

2. The system of claim 1, wherein the observer is a sliding observer, and a Luenberger Observer gain H and a sliding gain K are determined by adding a switching term to a Luenberger Observer.

3. A method for estimating needle lift of an injector with which fuel is injected, comprising:

measuring a current that is supplied to a solenoid in the injector;

estimating an armature lift and an armature speed on the basis of the current of the solenoid; and estimating a needle lift from a state equation including the measured solenoid current, the estimated armature lift, and the estimated armature speed as state variables.

4. The method of claim 3, wherein the armature lift and the armature speed are estimated from the following equations:

$$\dot{\hat{x}}_2=f_2(\hat{x},u)+h_2(x_1-\hat{x}_1)+k_2\text{sign}(x_1-\hat{x}_1)$$

$$\dot{\hat{x}}_3=f_3(\hat{x},u)+h_3(x_1-\hat{x}_1)+k_3\text{sign}(x_1-\hat{x}_1)$$

wherein $x_2$ is the armature lift, $x_3$ is the armature speed, and $\Delta f_i$ is $f_i(x,u)-f_i(\hat{x},u)$.

5. The method of claim 3, wherein in the step of estimating a needle lift, the needle lift is estimated through the following state equations using state variables which include the measured solenoid current the estimated armature lift, and the estimated armature speed:

wherein R is a resistance of the solenoid coil, E is a back force of electricity, L is an inductance, $A_o$ is a sectional area of an exit of the orifice, $k_a$ is a spring coefficient of the armature spring, $x_{af}$ is a free length of the armature spring, $x_{a0}$ is a predetermined initial length of the armature spring, $\beta_{fa}$ is a volumenometry modulus of elasticity of the fuel inside the armature chamber, $V_{a0}$ is an initial volume of the armature chamber, $A_a$ is a projection area of the armature chamber, $C_{do}$ is a coefficient of a quantity of flow in the exit of the orifice, $A_{oa}$ is a sectional area of a return line from the armature chamber to the fuel tank, $P_{return}$ is a return pressure, $\beta_f$ is a volumenometry modulus of elasticity of the fuel in the pressure control chamber, $V_{c0}$ is an initial volume of the pressure control chamber, $A_p$ is a projection area of the piston, $A_i$ is a sectional area of the entrance of the orifice, $C_{di}$ is a coefficient of quantity of flow in the entrance of the orifice, $P_{rail}$ is a pressure of the rail, $x_{pf}$ is a free length of the piston spring, $x_{p0}$ is a predetermined initial length of the piston spring, $A_n$ is a projection area of the needle, $A_s$ is a projection area of a needle valve seat, $m_p$ is a mass of the piston, and $m_n$ is a mass of the needle.

* * * * *